3,469,004
FUNGICIDALLY ACTIVE ORGANOGLYOXYL-
ONITRILE OXIMINO PHOSPHATES AND
PHOSPHONATES
Harold A. Kaufman and Roger P. Napier, Piscataway, and Stanley T. D. Gough, Raritan, N.J., assignors to Mobil Oil Corporation, a corporation of New York
No Drawing. Filed Mar. 17, 1967, Ser. No. 623,841
Int. Cl. A01n 9/36
U.S. Cl. 424—202　　　　　　　　　　　　　11 Claims

ABSTRACT OF THE DISCLOSURE

A method is provided for controlling fungus growth with organoglyoxylonitrile oximino phosphates and phosphonates, the organic moiety including aromatic, heterocyclic and certain combinations of aromatic and heterocyclics such as the benzothienyl group. The phosphorus-containing moiety contains alkyl groups optionally separated from the phosphorus atom by oxygen or sulfur.

CROSS REFERENCES TO RELATED APPLICATIONS

The compounds disclosed herein as fungicides are more fully described, including methods for their preparation, in U.S. Ser. No. 585,742, filed Oct. 11, 1966.

BACKGROUND OF THE INVENTION

Field of the invention

This invention relates to the control of fungus growth. Specifically it relates to the control of fungus growth with organoglyoxylonitrile oximino phosphates and phosphonates.

Description of the prior art

It is well known in this art that the control of fungus growth is an important consideration in the economics of agriculture, both from the standpoint of yields of crop and return on the growers investment. It is also known that it is important to homeowners to control fungus growth on his ornamentals, lawn, and other parts of the overall landscaping surrounding his home.

The problems associated with effective fungus control are varied, and the solution will depend to a large extent upon the nature of the parasite as well as the nature of its host. For example, the fungus may be one which is susceptible to attack by a contact fungicide that cannot be used because it is phytotoxic to the plant host. On the other hand, a fungus growth may be controlled by a translocated fungicide that is not usable because it leaves an objectionable level of residue in the host plant or fruit thereof. Thus, a good fungicide must be nonphytotoxic, and it must be, if it is systemic, expelled by the plant or be converted to an innoxious structure. The fungicides of this invention are believed to be nonphytotoxic, and not prone to leave objectionable residue levels.

The closest reference known disclosing the compounds of this invention is South African Patent 66–1670 (cf. Belgium Patent 678,139). This reference, however, does not disclose the chemicals useful in this invention as fungicides.

SUMMARY OF THE INVENTION

In accordance with the invention a method is provided for the control of fungus growth which comprises applying thereto a fungicidal amount of a compound of the formula

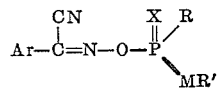

wherein Ar is an organic radical selected from the group consisting of aromatic, aroyl, heterocyclic, and combinations of aromatic and heterocyclic as parts of the same radical, which radical may have substituted therein a member of the group consisting of halogen, thiocyano, $NO_2$, $C_1$–$C_4$ alkoxy, $C_1$–$C_4$ haloalkyl, aryl, aroyl, cyano, $C_1$–$C_4$ alkylmercapto, alkyl sulfonyl, aryl, $C_2$–$C_5$ carbalkoxy, amide, $C_1$–$C_4$ dialkylamino and $C_1$–$C_6$ alkyl, R is a member of the group consisting of $C_1$–$C_4$ alkyl and $C_1$–$C_4$ alkoxy, R' is $C_1$–$C_4$ alkyl, X is a member of the group consisting of oxygen and sulfur, and M is a member of the group consisting of oxygen and sulfur, M being oxygen when R is alkoxy.

It will be understood from the above definition of the elements of the generic formula (and the appended claims should be so construed) that the organic radical may be unsubstituted or it may have one, or two, or more of the listed substituents as portions of its nucleus.

Included among the aromatic radicals which form a part of the oximino nucleous are phenyl, naphthyl, and other multiple ring radicals containing up to about three rings. The heterocyclic systems contemplated contain a single ring having therein oxygen, sulfur, nitrogen, or a combination thereof. Examples are radicals derived from furan, pyridine, thiazole, and the like. Included among the systems which contain a combination of aromatic and heterocyclic portions as parts of the same radical are benzothienyl, and the like.

The phosphates disclosed herein exhibit considerable fungicidal activity, which is defined for purposes of this specification and the appended claims as a capacity for killing, inhibiting, or inactivating a fungus, and thereby for preventing a controlling its growth. The compounds are active against a large number of organisms and these include *Monilinia fructiola, Stemphylium sarcinaefrome, Alternaria oleracea, Phytophthora capsici, Puccinia graminis, Fusarium oxysporium, Pythium debaryanum, Rhizoctonia solani,* and *Sclerotium rolfsii.*

DESCRIPTION OF SPECIFIC EMBODIMENTS

The following examples will illustrate methods for preparing the useful fungicides of this invention. It will be understood that the examples given will merely illustrate the invention by way of specific embodiments, and thus are not to be construed as being the only method by which these may be prepared. In the examples "parts" are by weight.

Example 1

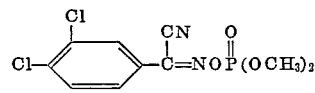

3,4-dichlorophenylglyoxylonitrile oximino O,O-dimethyl phosphate

Five parts of 3,4 - dichlorophenylglyoxylonitrile oxime sodium salt was slurried in 30 parts of benzene and five parts of O,O - dimethylphosphorochloridate was added dropwise over a one hour period at 40° C. with stirring. The reaction mixture was stirred at reflux for one hour after completing the addition, and was then cooled. The mixture was washed with 10 parts of 5% aqueous sodium hydroxide. The benzene was dried with magnesium sulfate and stripped at 60° C. and 15 mm. of Hg, giving a quantitative yield of product, having IR and NMR constants commensurate with the assigned structure.

Example 2 m-Chlorophenylglyoxylonitrile oximino O,O-dimethyl phosphate

In a manner similar to the method outlined in Example 1, m-chlorophenylglyoxylonitrile oxime sodium salt was allowed to react with O,O-dimethylphosphorochloridate to give the product having IR and NMR constants commensurate with its structure.

Example 3

2-benzothienylglyoxylonitrile oximino O,O-diethyl phosphate

In a manner similar to Example 1, 2-benzothienylglyoxylonitrile oxime sodium salt was reacted with O,O-diethylphosphorochloridate to give the product showing spectroscopy data commensurate with its assigned structure.

Example 4

3-methylphenylgloxylonitrile oximino O,O-dimethyl phosphate 3-methylphenylgloxylonitrile oxime sodium salt was reacted with O,O-dimethylphosphorochloridate according to the method of Example 1 to give the expected product.

Example 5

Phenylglyoxylonitrile O,O-dimethyl phosphate

Phenylglyoxylonitrile oxime sodium salt was reacted with O,O-dimethylphosphorochloridate in accordance with the method of Example 1 to give the expected product.

The fungicides of the present invention are stable and well-defined, and are particularly suited for fungicidal use when employed alone or in combination with inert carriers generally utilized in the fungicide art. The carrier adjuvants may be liquid or solid, depending upon the area to be treated, the type of host, and the kind of equipment available for application. When employing liquid formulations, they may be in the form of true solutions, dispersions, or emulsions containing, preferably, a small amount of a wetting agent. The compositions will contain a minor, fungicidal amount of compound and a major amount of the carrier therefor.

It is noted that the inventive compounds are generally water insoluble, thus requiring an organic solvent when true solutions are desirable or necessary. Acetone, for example, can be used as the solvent. Others will be obvious to those skilled in the art, and need not be set forth herein.

When dispersions are used, the dispersive medium will generally be essentially aqueous, but it may contain small quantities or organic solvent, i.e., amounts not sufficient to cause solution of the active member, as well as a small amount of a wetting agent to aid in holding the particles in suspension.

The wetting agents referred to in addition to aiding in suspending the toxic particles, are useful as aids in uniformly distributing the active material over the area to be treated. In other words, the wetting agent helps to prevent build-up of droplets on certain portions of the area, whereupon other portions are left untouched or insufficiently treated by the toxicant. These agents are well known to the art and it would serve no useful purpose to enumerate them here. One example, however, of a useful wetting agent is Tween-20, a polyethylene sorbitan monolaurate.

Solid formulations contemplated may be dusts or granules containing fungicidal amounts of the disclosed fungicides. Many solids are known by the art to be useful as fungicidal carriers. Examples of these are kaolin, talc, kieselguhr, diatomaceous earth, pyrophyllite, bentonite, calcium carbonate, powdered cork, wood, walnut shells and peanut shells, fuller's earth, tricalcium phosphate, and the like. Formulations using these carriers may be prepared in known ways.

Additionally, the inventive compounds may be applied as aerosols, in which case it is convenient to dissolve them in any suitable solvent and to disperse this solution in dichlorofluoromethane or other chlorofluoroalkane having a boiling point below room temperature at ambient pressures. It is contemplated that other suitable materials boiling below room temperature will also be useful for this purpose.

The concentration of the chemicals in the compositions disclosed herein may vary over a wide range provided a fungicidal or toxic dosage thereof is placed upon the plant or in its immediate surroundings. Thus, the important consideration is not minimum and maximum concentrations, but the most economical concentration. The inventive fungicides are effective over a wide range, and the most suitable ratio of carrier to active ingredient will be governed by the amount of carrier needed to give an even distribution of a growth controlling quantity of active material over the area under treatment.

In controlling soil-borne fungus growths with the disclosed chemicals, the toxicant or compositions containing it may be sprayed (if a liquid) or spread (if a solid) over the ground. Thereafter, the material may be left to the natural action of rainfall, or it may be drenched or plowed and disked into the soil. When used on plant hosts, a solid formulation may be dusted onto the plants by the same method used to apply other well known solid fungicidal compositions. When liquid sprays are employed to treat plants, the liquid composition may be sprayed thereon just to the point of liquid run-off.

The following will illustrate the activity of the fungicidal compounds of this invention. It will be understood that they are not intended to limit the scope of the invention.

TEST METHODS

Depression slide (spore germination) test

Fungus species *Monilinia fructicola* and *Stemphylium sarcinaeforme* (MF and SS, respectively, in the tables below) were cultured on potato dextrose agar and oat agar, respectively, at room temperature under continuous fluorescent light. Spores growing in 90 mm. petri dishes containing 40 ml. of the respective agar medium were ready for the tests after one week.

Spores were obtained by scraping them from the surface of the cultures with a rubber policeman or bacterial loop and washing them free with distilled water. The spores in suspension were filtered through a thin layer of glass wool to remove bits of mycelium, and freed of soluble extraneous materials by centrifuging and resuspending in distilled water. The spore concentration was adjusted to 10,000 per ml. using a Fuchs-Rosenthal counting chamber.

Washing spores (as described above) eliminates water-soluble agents which might effect germination. However, washed spores of some fungi will not germinate readily in distilled water. A spore germination stimulant of ultra filtered orange juice was prepared by filtering fresh orange juice through cheesecloth and then through fine filter paper. The filtrate was diluted with distilled water to give a 10% solution. Five ml. portions were placed in 2-dram, screw-capped vials and stored in the freezer until needed. When needed, the 10% solution was again diluted 1:9 and added to the spore solution in equal amounts, giving a stimulant concentration of 0.5%.

One hundred mg. of each test compound was weighed into a 4-dram wide-mouth vial and dissolved in 10 ml. of a volatile solvent (usually acetone) giving a 10,000 p.p.m. concentration. A 50 p.p.m. concentration was prepared by serial dilution.

Two-tenths ml. of the 50 p.p.m. solution was placed in the well of a hollow-ground depression slide. One slide was prepared for each fungus organism. The volatile solvent was allowed to evaporate (15 minutes for acetone) leaving a deposit of the toxicant. Two-tenths ml. of the spore suspension-stimulant mixture was then added to each slide.

Slides were placed in large, inverted glass moisture chambers on metal holding racks and the chambers were sealed with water to maintain a high relative humidity of near 100%. Chambers were held at constant room temperature near 24° C.

After 24 hours, results were taken by counting the number of spores germinating per 50 spores from each of the two slides treated with the compound. The number failing to germinate was recorded as percent spore germination inhibition. The spore germination inhibition caused by each compound was rated 1 through 10 according to the following key:

| Rating: | Explanation (percent inhibition) |
| --- | --- |
| 1 | 0 |
| 2 | 1–20 |
| 3 | 30 |
| 4 | 40 |
| 5 | 50 |
| 6 | 60 |
| 7 | 70 |
| 8 | 80 |
| 9 | 90 |
| 10 | 100 |

Soil screening method

Four representative soil fungi *Fusarium oxysporium, Pythium debaryanum, Rhizoctonia solani* and *Sclerotium rolfsii* (FO, PD, RS and SR, respectively, in the tables below) were maintained on potato dextrose agar, in 20 x 15 mm. test tubes. Inoculum for the tests was increased in 1000 ml. Erlenmeyer flask on a ¼ corn meal-¾ sand mixture (by volume). The medium was saturated with water and sterilized by autoclaving at 15 lbs. pressure for 20 minutes on two successive days. The medium was inoculated by transferring, aseptically, a small portion of mycelium from the test tube cultures 14 days prior to using for inoculum.

Method of treatment (50 p.p.m. based on the weight of the soil)

An inoculated medium for each of the four soil organisms was prepared as follows: A 14-day old 1000 ml. flask of the cornmeal sand inoculum was used to inoculate twenty 10 oz. cups of sterile soil by blending the inoculum and sterile sand for 10 minutes in a cement mixer.

The inoculated medium was then placed in 10 oz. wax treated cups (20 cups of each organism) and treated as follows: A 150 mg. quantity of each candidate fungicide was weighed on the analytical balance and formulated using 10 ml. of acetone and 190 ml. of $H_2O$. (If the compound is insoluble in acetone or water, 1.1 g. of Continental Clay, .1 g. of Marasperse N and 2 g. of Petro-BP is added and the mixture ground in the Waring Blender for three minutes.) A 50 ml. quantity of each chemical formulation was used to drench 1 cup inoculated with each of the 4 fungal organisms. Immediately after the cups were drenched they were placed in polyethylene bags (1 cup per bag) and held at 70° F. for 14 days.

After 14 days, each cup was examined for the presence of fungal growth and each compound rated according to the key as set forth in the spore germination test.

The following table summarizes the results obtained using the fungicidal compounds according to the above outlined methods.

FUNGICIDAL ACTIVITY, CONTROL AT 50 p.p.m.

| Compound | Spore | | Soil | | | |
| --- | --- | --- | --- | --- | --- | --- |
| | MF | SS | FO | PD | RS | SR |
| 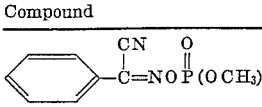 | 8 | | 8 | 9 | | |
| 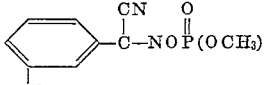 | 9 | 9 | 10 | 9 | 9 | 8 |
| 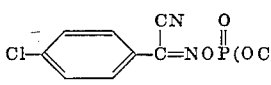 | 7 | 10 | | | 9 | |
| 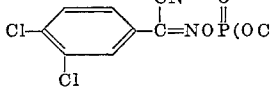 | 10 | 10 | 10 | 9 | 8 | 4 |
| 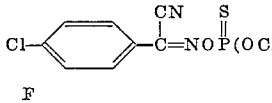 | 4 | | 6 | | | |
| 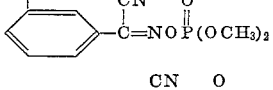 | 9 | 9 | 9 | | | |
| 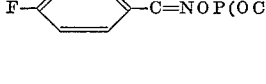 | 6 | | | | | |

FUNGICIDAL ACTIVITY, CONTROL AT 50 p.p.m.—Continued

| Compound | Spore | | Soil | | | |
|---|---|---|---|---|---|---|
| | MF | SS | FO | PD | RS | SR |
| Br-C₆H₄-C(CN)=NOP(O)(OCH₃)₂ | 10 | 10 | | | 3 | 8 |
| (2-Br)C₆H₄-C(CN)=NOP(O)(OCH₃)₂ | 10 | 8 | | | | 8 |
| (3-CH₃)C₆H₄-C(CN)=NOP(O)(OCH₃)₂ | 9 | 9 | 8 | | 7 | 6 |
| CH₃-C₆H₄-C(CN)=NOP(O)(OCH₃)₂ | 9 | 8 | 10 | | | |
| (2,4-(CH₃)₂)C₆H₃-C(CN)=NOP(O)(OC₂H₅)₂ | 9 | 6 | 9 | 9 | | |
| (2-CH₃)C₆H₄-C(CN)=NOP(O)(OCH₃)₂ | | | 8 | 9 | | |
| (2,4,6-(CH₃)₃)C₆H₂-C(CN)=NOP(O)(OCH₃)₂ | 10 | | | | 4 | |
| CH₃O-C₆H₄-C(CN)=NOP(O)(OCH₃)₂ | 3 | | 4 | 6 | 9 | |
| (3,4-(CH₃O)₂)C₆H₃-C(CN)=NOP(O)(OCH₃)₂ | 10 | | | | | |
| (3-NO₂,4-OCH₃,...)C₆H₂(OCH₃)-C(CN)=NOP(O)(OCH₃)₂ | | | 3 | 4 | | |
| C₂H₅OOC-C₆H₄-C(CN)=NOP(O)(OCH₃)₂ | 10 | 5 | | | | |
| (COOC₂H₅)C₆H₄-C(CN)=NOP(O)(OCH₃)₂ | 5 | 8 | 4 | 9 | 4 | |
| (COOC₂H₅)C₆H₄-C(CN)=NOP(O)(OCH₃)₂ | 5 | | | 9 | | |
| benzothiophene-C(CN)=NOP(O)(OC₂H₅)₂ | 7 | 9 | 7 | 9 | | |
| furyl-C(CN)=NOP(O)(OC₂H₅)₂ | 5 | | 8 | | | |
| biphenyl-C(CN)=NOP(O)(OC₂H₅)₂ | | | 8 | | | |
| C₆H₅-CO-C₆H₄-C(CN)=NOP(O)(OCH₃)₂ | 10 | | | | | |

FUNGICIDAL ACTIVITY, CONTROL AT 50 p.p.m.—Continued

| Compound | Spore | | Soil | | | |
|---|---|---|---|---|---|---|
| | MF | SS | FO | PD | RS | SR |
|  | 9 | 5 | | | | |
| 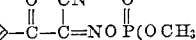 | | | | 6 | 7 | |
|  | | | | | 5 | 9 |

Following are additional examples of compounds which fall within the scope of the invention, and which are prepared substantially in accordance with the method set forth hereinabove.

Phenylglyoxylonitrile oximino dibutyl phosphate, p-chlorophenylglyoxylonitrile oximino methyl methylphosphonothioate, m-nitrophenylglyoxylonitrile oximino dimethyl phosphate, p-nitro-m-methylphenylglyoxylonitrile oximino dimethyl phosphorothioate, p-cyanophenylglyoxylonitrile oximino dipropyl phosphorothioate, and o-cyanophenylglyoxylonitrile oximino dimethyl phosphate.

o-Propoxyphenylglyoxylonitrile oximino diethyl phosphate, p-butoxyphenylglyoxylonitrile oximino dietheyl phosphate, m-methyl- and p-methylthiophiophenylglyoxylontrile oximino dimethyl phosphorothioate, p-propylthiophenylglyoxylonitrile oximino diethyl phosphate, p-butylthiophenylglyoxylonitrile oximino dibutyl phosphorothioate, p-methylphenylglyoxylonitrile oximino diethyl phosphorothioate, p-propylphenylglyoxylonitrile oximino dibutyl phosphate, and p-hexylphenylglyoxylonitrile oximino diethyl phosphate.

p-Carbomethoxyphenylglyoxylonitrile oximino diethyl phosphorothioate, p - carbobutoxyphenylglyoxylonitrile oximo dipropyl phosphorothioate, p-carbamylphenylglyoxylonitrile oximino dimethyl phosphate, p-(N,N-dimethylcarbamyl) phenylglyoxylonitrile oximino dimethyl phosphorothioate, 4 - (dimethylamino)3,5 - dimethyl phenylglyoxylonitrile oximino dimethyl phosphate, 3-furylglyoxylonitrile oximino dimethyl phosphate, and 4 - tolylsulfurylphenylglyoxylonitrile oximino dimethyl phosphate.

We claim:
1. A method for controlling fungus growth which comprises applying thereto a fungicidal amount of a compound of the formula

$$Ar-\underset{\underset{CN}{|}}{C}=NO\underset{\underset{MR'}{\diagdown}}{\overset{X\phantom{xx}R}{\overset{\|}{P}\diagup}}$$

wherein Ar is an organic radical selected from the group consisting of (1) benzoyl and (2) phenyl, diphenyl, benzothienyl, and furyl, which radical (2) may have substituted therein a member of the group consisting of halogen, NO₂, $C_1$–$C_4$ alkoxy, $C_1$–$C_4$ haloalkyl, aroyl, $C_2$–$C_5$ carbalkoxy, and $C_1$–$C_6$ alkyl, R is a member of the consisting of (1) benzoyl and (2)phenyl, diphenyl, ben- $C_1$–$C_4$ alkyl, X is a member of the group consisting of oxygen and sulfur, and M is a member of the group consisting of oxygen and sulfur, M being oxygen when R is alkoxy.

2. The method of claim 1 in which the compound is

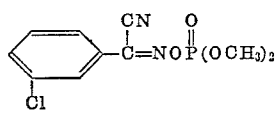

3. The method of claim 1 in which the compound is

Cl—⟨phenyl with Cl⟩—C(CN)=NOP(O)(OCH₃)₂

4. The method of claim 1 in which the compound is

CH₃—⟨phenyl⟩—C(CN)=NOP(O)(OCH₃)₂

5. The method of claim 1 in which the compound is

CH₃O—⟨phenyl with OCH₃⟩—C(CN)=NOP(O)(OCH₃)₂

6. The method of claim 1 in which the compound is

⟨phenyl with COOC₂H₅⟩—C(CN)=NOP(O)(OCH₃)₂

7. The method of claim 1 in which the compound is

⟨benzothienyl⟩—C(CN)=NOP(O)(OC₂H₅)₂

8. The method of claim 1 in which the compound is

⟨furyl⟩—C(CN)=NOP(O)(OC₂H₅)₂

9. The method of claim 1 in which the compound is

⟨biphenyl⟩—C(CN)=NOP(O)(OC₂H₅)₂

10. The method of claim 1 in which the compound is

⟨phenyl⟩—C(O)—⟨phenyl⟩—C(CN)=NOP(O)(OCH₃)₂

11. The method of claim 1 in which the compound is

⟨phenyl⟩—C(O)—C(CN)=NOP(O)(OCH₃)₂

References Cited

UNITED STATES PATENTS

| | | | |
|---|---|---|---|
| 3,126,314 | 3/1964 | Fanciter et al. | 424—202 |
| 3,165,441 | 1/1965 | Ludvik et al. | 424—202 |
| 3,235,592 | 2/1966 | Wilson et al. | 260—551 |

ALBERT T. MEYERS, Primary Examiner

D. M. STEPHENS, Assistant Examiner

U.S. Cl. X.R.

424—203, 210

PO-1050
(5/69)

UNITED STATES PATENT OFFICE
CERTIFICATE OF CORRECTION

Patent No. 3,469,004      Dated Sept. 23, 1969

Inventor(s) Kaufman et al.

It is certified that error appears in the above-identified patent and that said Letters Patent are hereby corrected as shown below:

Column 2, line 40, "a" should read --or--.
Column 9, line 21, "chlororophenylglyoxylonitrile" should read --chlorophenylglyoxylonitrile--.
Column 9, line 31, "p-methylthiophiophenylglyoxylonitrile" should read --p-methylthiophenylglyoxylonitrile--.
Column 9, line 64, (claim 1), after "member of the" insert --group--.
Column 9, line 65, after "consisting of" delete "(1) benzoyl and (2) phenyl, diphenyl, ben-" and insert therefor --$C_1$-$C_4$ alkyl and $C_1$-$C_4$ alkoxy, R' is--.

SIGNED AND
SEALED

JUN 16 1970

(SEAL)
Attest:

Edward M. Fletcher, Jr.
Attesting Officer

WILLIAM E. SCHUYLER, JR.
Commissioner of Patents